United States Patent [19]

Nancarrow

[11] 4,177,006
[45] Dec. 4, 1979

[54] TURBOCHARGER CONTROL

[75] Inventor: James H. Nancarrow, Torrance, Calif.

[73] Assignee: The Garrett Corporation, Los Angeles, Calif.

[21] Appl. No.: 837,799

[22] Filed: Sep. 29, 1977

[51] Int. Cl.² .................. F01D 17/14; F01D 17/18
[52] U.S. Cl. .................................. 415/151; 415/205; 60/602
[58] Field of Search .............. 415/205, 151; 417/407; 60/605, 602

[56] References Cited

U.S. PATENT DOCUMENTS

| 3,270,495 | 9/1966 | Connor | 415/205 UX |
| 3,292,364 | 12/1966 | Cazier | 415/203 X |
| 3,313,518 | 4/1967 | Nancarrow | 415/205 X |
| 3,408,046 | 10/1968 | Woollenweber, Jr. | 415/205 X |
| 3,557,549 | 1/1971 | Webster | 415/205 X |
| 3,614,259 | 10/1971 | Neff | 415/205 |
| 3,844,676 | 10/1974 | Betteridge | 417/407 X |
| 4,008,572 | 2/1977 | Woollenweber, Jr. | 415/205 X |
| 4,075,849 | 2/1978 | Richardson | 60/605 X |

Primary Examiner—Louis J. Casaregola
Attorney, Agent, or Firm—Stuart O. Lowry; Albert J. Miller

[57] ABSTRACT

A variable flow geometry, meridionally divided turbine housing for use in an exhaust gas driven turbine of a turbocharger.

36 Claims, 7 Drawing Figures

TURBOCHARGER CONTROL

BACKGROUND OF THE INVENTION

This invention relates to turbochargers for supplying relatively high pressure charge air to an internal combustion engine. More specifically, this invention relates to an improved turbocharger construction including control means for controlling turbocharger boost pressures in accordance with engine operating parameters such as speed and load.

Turbochargers are well known in the prior art, and typically comprise a turbine wheel and a compressor wheel mounted on a common shaft and carried within isolated turbine and compressor housings, respectively. The turbine housing includes a gas inlet and a gas outlet, and is coupled to the exhaust gas manifold of a combustion engine for circulation of the exhaust gases through the turbine housing to rotatably drive the turbine wheel. In turn, the turbine wheel rotatably drives the compressor wheel which comprises ambient charge air, and supplies the compressed air to the intake manifold of the engine.

Turbocharged engines are highly advantageous when compared with conventional naturally aspirated engines in that substantially denser air is delivered to the combustion chamber or cylinders of the engine. This increased air density enables the engine to operate at substantially higher performance levels and with greater efficiency. However, with many combustion engines, it is desirable to limit the maximum pressure, or boost, at which the charge air is delivered to the engine. That is, particularly at relatively high speed or load conditions, many turbochargers are capable of delivering charge air to the engine at pressures substantially greater than the engine or the turbocharger can withstand. Similarly, at relatively low speed or load conditions, the turbocharger output is often below a minimum desired pressure level. In this regard, the prior art includes a wide variety of valves and other pressure control devices and methods designed to adjust the turbocharger boost pressure as a function of predetermined engine operating conditions.

One method for improving turbocharger boost pressure at relatively low engine speed or load conditions has been to provide a divided turbine housing. That is, particularly for use with a multiple cylinder internal combustion engine, a divided turbine housing may be used having two generally identical turbine inflow volute passages each providing flow communication with the turbine wheel. See, for example, U.S. Pat. No. 3,292,364. The two volute passages are coupled to different ones of the engine cylinders so that the engine exhaust gas flow is divided into a pair of substantially similar pulsating gas streams. The pulse effect of the exhaust gases is particularly pronounced at low speed or load operation to yield an improved turbocharger boost pressure when compared with conventional non-divided turbine housings. However, such divided turbine housings are not designed to overcome the problem of turbocharger overboost when the engine is operated at relatively high speeds or loads.

Many control devices have been proposed for limiting maximum turbocharger boost pressure, and thereby controlling turbocharger overboost. Some of these devices are designed for use with a divided turbine housing, and comprise a coupling of the volute passages to a common exhaust stream. A valve is provided for variably opening and closing one of the volute passages to thereby adjust the gas flow characteristics. See, for example, U.S. Pat. No. 3,270,495. Devices of this type do not, however, take advantage of the gas flow pulse effect of true divided housing operation since the volute passages do not pass equal and balanced gas flows under all operations and conditions. Other similar prior art devices include movable flap valves for inversely adjusting the gas flow in a pair of volute passages to alter the gas flow characteristics. See, for example, U.S. Pat. Nos. 3,557,549 and 3,614,249. However, these devices also fail to achieve equal, balanced gas flow at all times, and thereby do not provide the pulsation advantages of a true divided housing operation. Still other prior art devices provide adjustable gas flow characteristics by means of relatively complicated movable vanes. See, for example, U.S. Pat. No. 3,313,518.

This invention overcomes the problems and disadvantages of the prior art by providing an improved turbocharger having a divided turbine housing, and including a valve and supplemental control volutes for adjustably controlling the gas flow rate within the turbine housing in accordance with engine operating parameters.

SUMMARY OF THE INVENTION

In accordance with the invention, a turbocharger is provided having a turbine wheel and a compressor wheel mounted on a common shaft and carried within separate turbine and compressor housings, respectively. The turbine housing is adapted for coupling to the exhaust gas manifold of a combustion engine, and includes a gas inlet and a gas outlet for the circulation of engine exhaust gases into and through the turbine housing to drivingly rotate the turbine wheel. The turbine wheel in turn drives the compressor wheel which supplies compressed charge air to the intake manifold of the engine.

The turbine housing comprises a meridionally divided housing having a pair of axially separated turbine inflow volutes. The inflow volutes are coupled to different ones of the engine cylinders, and thereby form a pair of primary gas passages for the pulse-type impingement of exhaust gases upon the turbine wheel. The turbine housing also includes a pair of relatively short and arcuately shaped control passages disposed radially inwardly from the primary volutes to form a pair of secondary paths for exhaust gases for impingement upon the turbine wheel. A control valve is operable in response to engine operating conditions such as speed and load to controllably adjust the flow of gases through the control volutes, and thereby limit the turbocharger boost pressure.

In a preferred mode of operation, the control valve is adjustably positioned by an actuator to close or substantially close when the engine is operated at relatively low speeds or loads to thereby prevent or limit exhaust gas passage through the control volutes. In this position, the primary inflow volutes comprise the main cross sectional flow area open to gas passage whereby the gas flow rate is relatively fast to provide substantial turbocharger boost. As engine speed or load increases, the actuator progressively opens the valve so that the cross sectional area open to gas flow increases to include the secondary control volutes, and thereby limit turbocharger boost.

BRIEF DESCRIPTION OF THE DRAWINGS

The accompanying drawings illustrate the invention. In such drawings.

DETAILED DESCRIPTION OF THE PREFERRED EMBODIMENT

Figure 1:
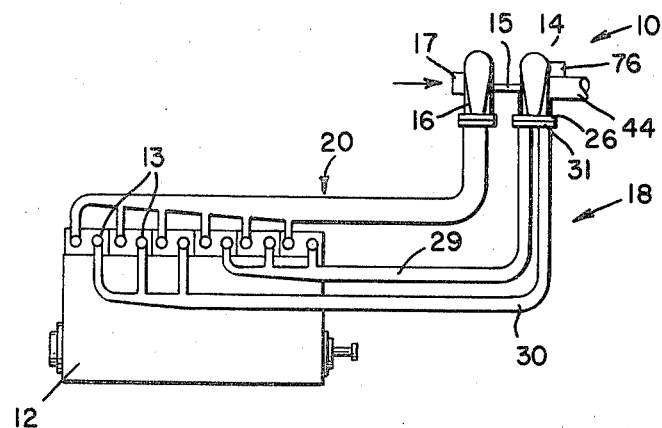
FIG. 1 is a schematic diagram of a controlled turbocharger of this invention coupled to a multiple cylinder internal combustion engine.

A turbocharger 10 for use with a multiple cylinder internal combustion engine 12 is shown schematically in FIG. 1, and generally comprises a turbine 14 and a compressor 16 coupled to the exhaust gas and air intake manifolds 18 and 20, respectively, of the engine 12. The turbocharger 10 serves to convert energy in the exhaust gases expelled by the engine cylinders 13 into rotary motion to drive a shaft 15 coupled to the compressor 16. In turn, the compressor 16 draws ambient air through an air inlet 17, and compresses the air for supply to the engine cylinders via the intake manifold 20. Thus, the turbocharger functions to supply the engine with relatively high pressure, high density charge air for ignition with a suitable fuel within the engine cylinders to obtain increased power and efficiency. Of course, while a multiple cylinder internal combustion engine is shown in the drawing, turbochargers are usable with a wide variety of combustion engines.

As shown in FIGS. 1-4, the turbine 14 comprises a turbine housing 22 with a gas inlet 24 for receiving exhaust gases from the engine 12. Conveniently, the gas inlet 24 includes an enlarged flange 26 at its entrance end including holes 28 for receiving bolts (not shown) for connecting the housing 22 to the exhaust gas manifold 18. In particular, the exhaust gas manifold comprises a pair of exhaust pipes 29 and 30 each coupled to the engine to receive exhaust gases expelled from a plurality of the engine cylinders, and terminating in a flange 31 for connection to the flange 28 on the housing inlet 24. Alternately, if desired, the two pipes 29 and 30 may comprise a pair of gas passages formed integrally in a single manifold casting. Importantly, as shown in FIG. 1, the manifold pipe 29 is connected to one-half of the engine cylinders, and the manifold pipe 30 is connected to the remaining cylinders. The specific cylinders coupled to each manifold pipe are chosen so that the hot exhaust gases expelled by the engine are coupled to the turbine housing by more than one manifold pipe, with the gases flowing through the pipes as a series of equally spaced and regular pulses.

The pulsating gas flows passing through the manifold pipes 29 and 30 are directed by the turbine housing 22 through separate housing flow passages for impingement upon the blades 32 of a radial inflow turbine wheel 34 mounted on the shaft 15 within said housing. More specifically, the housing 22 includes the inlet 24 coupled to the manifold pipes 29 and 30, and said inlet blends integrally into a spiralling or generally scroll-shaped housing portion 33 which continuously decreases in size. The housing also includes a radially inwardly extending meridional septum 40 extending along the inlet 24 and the scroll-shaped portion 33 to meridionally divide the turbine housing into a pair of axially separated turbine inflow passages 36 and 38. These passages 36 and 38 are aligned with the manifold pipes 29 and 30, respectively, to form a pair of primary flow paths conducting the exhaust gases circumferentially around the turbine housing and into communication with the turbine wheel 34. Accordingly, the passages 36 and 38 function to maintain the pulsating gas flow division between the pipes 29 and 30 so that the gas flows impinge upon the turbine wheel without substantial prior mixing. Importantly, the radially inner boundary of the two primary flow passages 36 and 38 is closed over an initial portion of the turbine wheel circumference, say about ninety degrees, by an arcuate divider wall 42 to be hereinafter described in more detail.

In operation, the exhaust gases passing through the primary inflow passages 36 and 38 impinge upon the turbine wheel 34 to drive the wheel at a rate of speed related to the velocity and mass flow rate of the gases. Accordingly, the rotational speed of the turbine wheel 34 is related to engine operating conditions, such as for example speed or load. Moreover, the cross-sectional flow area provided by the passages 36 and 38 affects the velocity of the exhaust gases, and thereby also affects the rotational speed of the turbine wheel. In this regard, the turbine housing 22 is designed with primary passages 36 and 38 sized for relatively rapid gas flow at relatively low engine operating conditions such as speed or load. In this manner, the exhaust gases drive the turbine wheel 34 at a rotational speed sufficient to drive the compressor 16 to provide substantial turbocharger boost. Of course, the gases are expelled from the turbine housing 22 through a gas outlet 44 for connection to suitable exhaust conduits or the like.

As the speed or load of the engine 12 increases, the velocity and mass flow rate of exhaust gases correspondingly increases. Accordingly, the turbine wheel rotational speed increases whereby boost pressure provided by the compressor 16 may exceed critical operating limits. In this regard, the turbine housing 22 is modified as shown in FIGS. 2-5 for varying the turbine housing flow geometry in accordance with engine operating conditions, and thereby preventing turbocharger overboost. Specifically, the divider wall 42 extends transversely across the scroll-shaped portion 33 of the housing to close the radially inner boundary of the primary passages 36 and 38 over an initial portion of the turbine wheel circumference. The leading edge 43 of the divider wall 42 is spaced radially outwardly from a tongue 45 for the turbine housing, and is disposed at the downstream end of the turbine inlet 24. From its leading edge, the divider wall 42 extends arcuately downstream along the scroll-shaped flow passages 36 and 38 generally on a scroll-shaped path with respect to the turbine wheel, and terminates at the conclusion of an arcuate path of about ninety degrees. A meridional septum 51 is cast integrally with the divider wall 42, and extends radially inwardly toward the turbine wheel to form a pair of relatively short, substantially similar control passages or volutes 48 and 50. These control passages 48 and 50 are then open inwardly for communication with the turbine wheel, and are formed inwardly from and generally concentric with the outer primary passages 36 and 38.

The upstream ends of the two inner control passages 48 and 50 are disposed generally at the downstream end of the turbine housing inlet 24, and are presented toward the inlet for receiving exhaust gas flow. Specifically, the inner passage 48 is positioned to receive a portion of the exhaust gas flow within the primary passage 36, and the inner passage 50 is positioned to receive a portion of the exhaust gas flow within the other primary passage 38. A control valve 54 is provided at the upstream ends of the inner passages 48 and 50 to control the division of gas flow between the inner and outer passages, and thereby control turbocharger boost.

The control valve 54 comprises a metal sleeve 56 received through the turbine housing 22 and extending transversely across the upstream ends of the inner passages 48 and 50. The sleeve 56 is shaped to seat within arcuately shaped recesses formed respectively on the leading edge 43 of the divider wall 42 and on the tongue 45. The sleeve is secured against axial or rotational movement as by a plurality of stakes 60. Further, the sleeve 56 includes axially displaced pairs of openings 62 and 64 in its opposite cylindrical surfaces to allow open passage of exhaust gases through the sleeve 56 and into the inner control passages 48 and 50.

Figure 5:
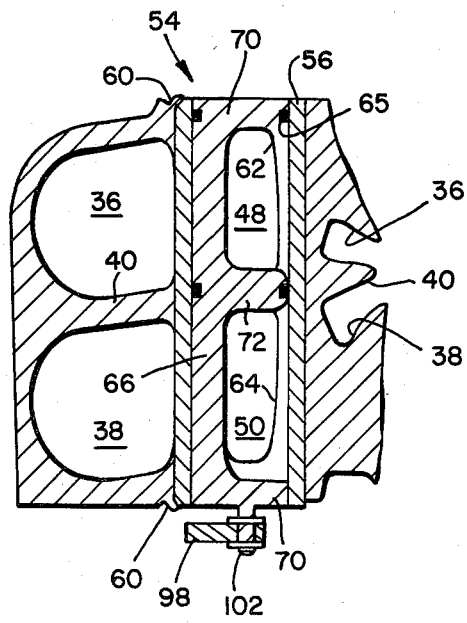
FIG. 5 is an enlarged fragmented horizontal section taken on the line 5—5 of FIG. 2.

A valve insert 66 is machined to matingly fit within the sleeve 56, and is formed to have a generally semicircular cross section with a length substantially equal to the length of said sleeve. The opposite ends of the insert 66 include disk-like caps 70 for closing the ends of the sleeve 56, and a disk-like central divider 72 separates the insert into two substantially identical flow openings aligned with the sleeve openings 62 and 64. Conveniently, the caps 70 and the divider 72 all carry annular sealing rings 65 for preventing gas leakage. When received within the sleeve 56, the valve insert 66 is rotatable with respect to the longitudinal axis of the sleeve to open and close the flow of exhaust gases through the inner passages 48 and 50. More specifically, as shown in FIG. 5, the valve insert 66 is movable to a first position with its flow openings aligned with the openings 62 and 64 of the sleeve whereby exhaust gases are allowed to flow from the primary passages 36 and 38 through the control volutes 48 and 50, respectively, via the valve 54. In this position, the effective cross sectional area through which the exhaust gases flow comprises both the outer primary passages 36 and 38, and the secondary inner passages 48 and 50 so that the relative velocity and mass flow rate of the incoming exhaust gases is reduced. Accordingly, when the engine is operating at high speed or load, the valve 54 is opened whereby the turbine wheel 34 is driven at less than maximum speed to consequently limit compressor boost pressure.

Figure 7:
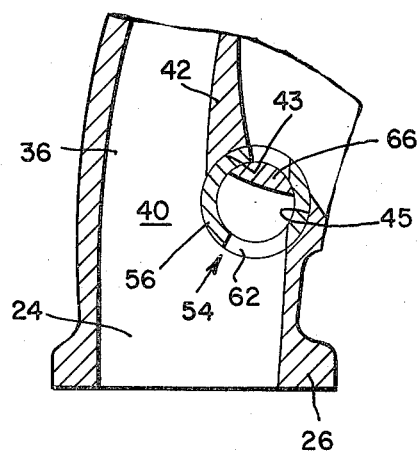
FIG. 7 is an enlarged fragmented section of the housing similar to a portion of FIG. 2, showing the valve in a closed position of operation.

As shown in FIG. 7, the valve insert 66 is movable to a second position closing the valve 54. Alternately, if desired, the valve insert 66 may be movable to a second position substantially closing the valve, depending upon the flow characteristics desired. More specifically, rotation of the valve insert 66 within the sleeve 56 moves the insert to a position closing or substantially closing the openings 62 and 64 of the valve. In this position, the engine exhaust gases are substantially prevented from entering the inner passages 48 and 50, and thereby flow at least primarily through the outer primary passages 36 and 38. Because the effective flow path area is at a minimum when the valve insert is in the second position, the gas velocity is maximized for any given set of engine operating conditions to provide substantial turbocharger boost pressure.

Figure 2:
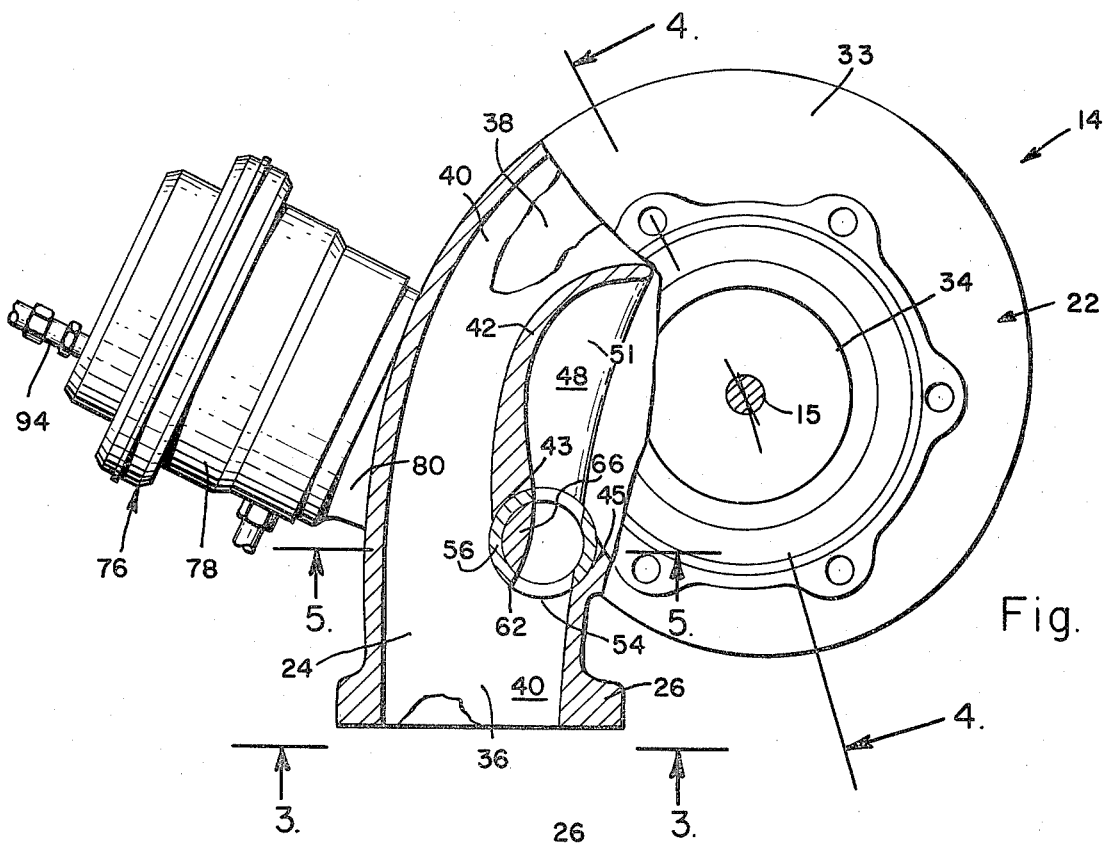
FIG. 2 is an enlarged side elevation view of the turbine housing of the turbocharger of FIG. 1, with portions broken away.
Figure 3:
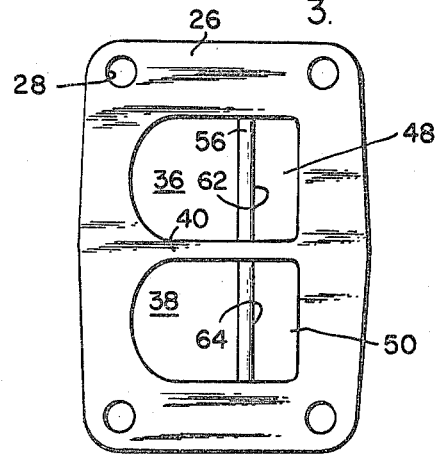
FIG. 3 is an enlarged fragmented bottom plan view of the turbine housing of FIG. 2 taken on the line 3—3 of FIG. 2.
Figure 4:
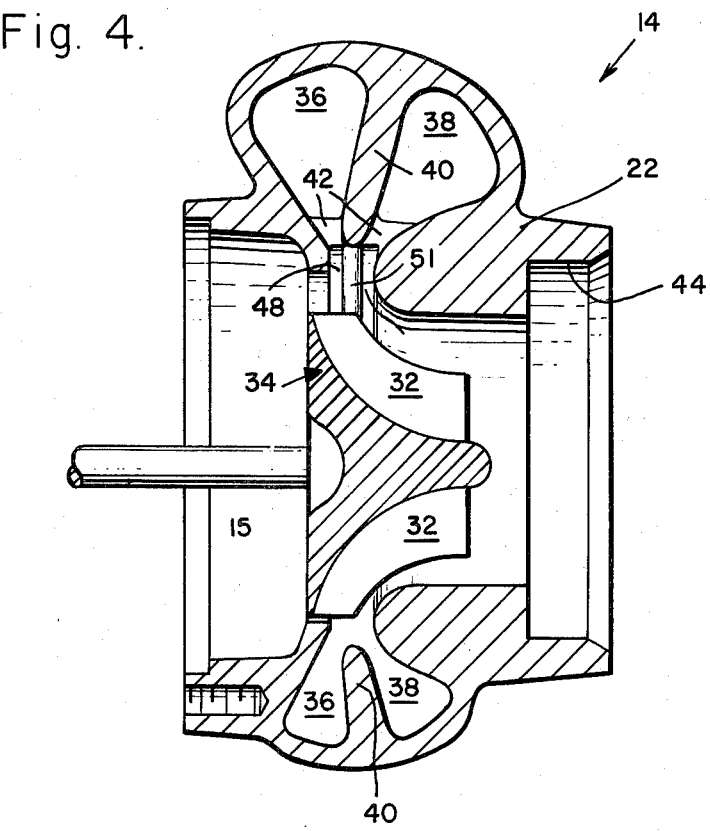
FIG. 4 is a section taken on the line 4—4 of FIG. 2.
Figure 6:
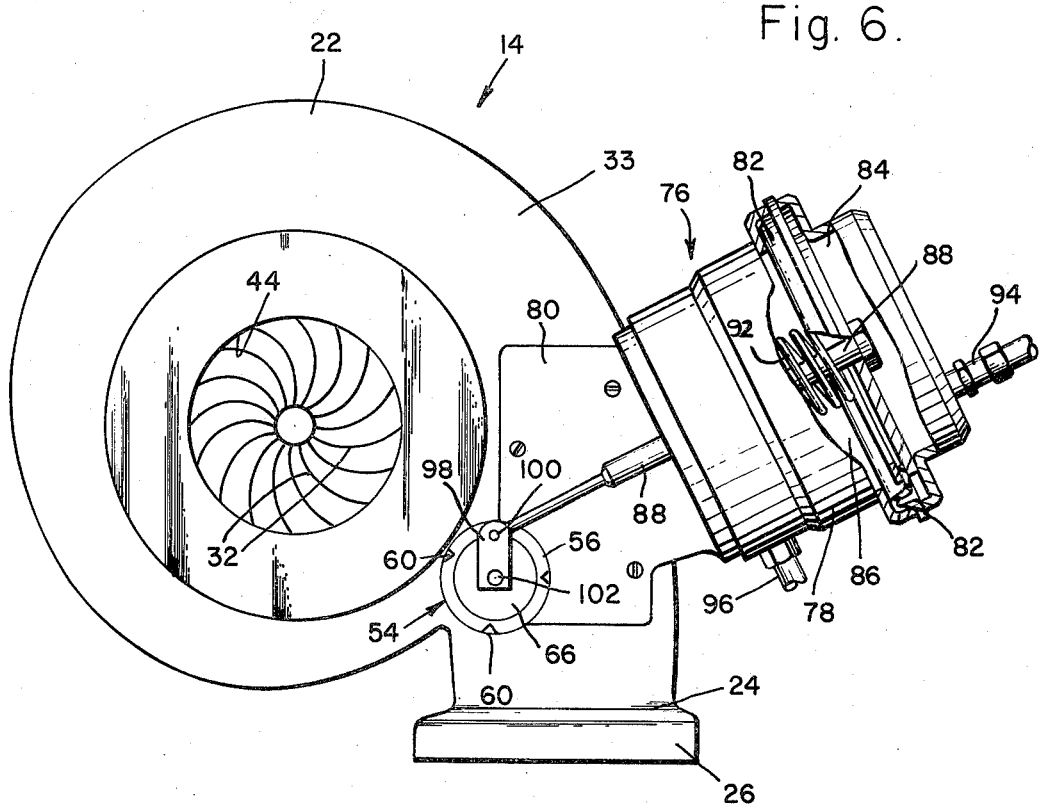
FIG. 6 is an enlarged elevation view of the side of the turbine housing opposite the side shown in FIG. 2, with portions broken away.

A valve actuator 76 is shown in FIGS. 2 and 6 for controllably moving the valve insert 66 in response to variations in engine speed or load. As shown, the actuator 75 comprises a canister 78 mounted on the turbine housing by brackets 80. The canister has an internal flexible diaphragm 82 dividing the canister interior into two isolated chambers 84 and 86. An actuator rod 88 is coupled to the diaphragm 82, and extends through the chamber 86 and through the canister 78 for connection to the valve insert 66. A spring 92 within the chamber 86 serves to bias the diaphragm 82 and the rod 88 against movement toward the valve insert 66. Nipples 94 and 96 are provided in the canister to provide open communication with the chambers 84 and 86, respectively. These nipples 94 and 96 allow the chambers 84 and 86 to be coupled with predetermined pressure sources for providing pressure control movement of the diaphragm and the actuator rod. For example, in some applications, it is desirable to couple the chamber 84 to compressor discharge pressure and the chamber 86 to ambient pressure. When the pressure in chamber 84 reaches a level predetermined by the mechanical characteristics of the spring 92, the diaphragm flexes downwardly against the spring 92 to carry the actuator rod 88 in the same direction. Of course, when the pressure in chamber 84 drops off, the reverse action occurs.

The lower end of the actuator rod 88 is pivotally connected to one end of a crank link 98 by a pin 100. The crank link 98 in turn has its other end fixed to an outwardly extending arm 102 formed integrally with the valve insert 66. Thus, downward movement of the actuator rod 88 serves to rotate the valve insert 66 in a counterclockwise direction as viewed in FIG. 6 to progressively open the valve 54. In this manner, as compressor discharge pressure increases, the valve 54 is progressively opened to increase the turbine housing area open to flow, and thereby limit turbocharger boost. As compressor discharge pressure decreases, the actuator 76 moves the valve 54 toward a closed position to progressively decrease the turbine housing flow area open to exhaust gas flow, and thereby obtain a relatively high turbocharger boost at low engine operating speed or load.

The turbocharger control of this invention provides wide range velocity control of exhaust gases entering the turbine housing for driving the turbine wheel. The control may be used alone, or in combination with other control devices such as wastegate valves and the like. Moreover, the actuator may be manual or automatic, or may be adapted for substantially any linear or non-linear response to variations in engine operating speed, load, or other parameters. The valve preferably includes the sleeve 56 to insure proper sealing when the valve is closed or substantially closed, but may be configured without the sleeve provided the valve insert and turbine housing are formed from compatible materials. Accordingly, it is intended that the scope of the present invention not be limited by the preferred embodiment set forth herein, but instead include these and other modifications and improvements within the skill of the art.

What is claimed is:

1. A turbocharger comprising a compressor; and a fluid driven turbine drivingly coupled to said compressor, said turbine including a turbine housing having a fluid inlet portion and a generally scroll-shaped portion, a radially inwardly extending meridonal septum dividing said inlet and scroll-shaped portions into a pair of axially displaced primary fluid flow paths, wall means formed integrally with said turbine housing for closing a portion of the radially inner boundary of said primary paths and for defining a radially inwardly open secondary flow path in communication with said primary paths, and valve means disposed along the secondary flow path and controllably movable between a first position opening said secondary path to allow fluid flow through both said primary and secondary paths, and a second position substantially closing said secondary path to fluid flow.

2. A turbocharger as set forth in claim 1 wherein said wall means includes a radially inwardly extending meridional septum dividing said secondary flow path into a pair of substantially similar secondary flow passages.

3. A turbocharger as set forth in claim 1 wherein said scroll-shaped portion extends from said inlet portion with a continuously decreasing size, and said wall means closes the radially inner boundary of said primary flow paths over about 90° generally at the upstream end of said scroll-shaped portion.

4. A turbocharger as set forth in claim 1 wherein said primary flow paths are substantially identical.

5. A turbocharger as set forth in claim 2 wherein said valve means includes means disposed along each of said secondary passages for uniform and simultaneous movement between said first and second positions.

6. A turbocharger as set forth in claim 5 wherein said valve means is disposed generally at the upstream ends of said secondary passages.

7. A turbocharger as set forth in claim 1 wherein said valve means comprises a sleeve mounted on said turbine housing along said secondary path and having flow openings to permit fluid flow through said sleeve and secondary path, and a valve insert movably carried within said sleeve for selectively controlling fluid flow through the flow openings in said sleeve.

8. A turbocharger as set forth in claim 2 wherein said valve means comprises a sleeve mounted on said turbine housing along said secondary passages and having flow openings disposed in each of said passages to permit fluid flow through said sleeve and said secondary passages, and a valve insert movably carried within said sleeve for selectively controlling fluid flow through the flow openings.

9. A turbocharger as set forth in claim 2 wherein said valve means includes means for controllably opening and limiting one of said secondary passages to fluid flow in one of said primary paths, and for controllably opening and limiting the other of said secondary passages to fluid flow in the other of said primary paths.

10. A turbocharger as set forth in claim 2 wherein said valve means includes means disposed in both of said secondary passages for controllably and together opening and limiting said secondary passages to fluid flow.

11. A turbocharger as set forth in claim 1 including actuator means for controllably adjusting the position of said valve means.

12. A turbocharger as set forth in claim 2 wherein said valve means comprises a sleeve mounted on said turbine housing generally at the upstream ends of said secondary passages and having flow openings to permit fluid flow through said sleeve and said secondary passages, and a valve insert having a generally semicircular cross section movably received within said sleeve for selectively controlling fluid flow through the flow openings, said insert including means for maintaining separate the flow through said secondary passages.

13. A turbocharger comprising a compressor; and a fluid driven turbine drivingly coupled to said compressor, said turbine including a turbine housing having a fluid inlet portion and a generally scroll-shaped portion, a radially inwardly extending meridional septum dividing said inlet and scroll-shaped portions into a pair of axially displaced primary fluid flow paths, wall means formed integrally with said turbine housing for closing a portion of the radially inner boundary of said primary paths and having means extending radially inwardly therefrom for defining a pair of radially inwardly open secondary flow passages open to respective ones of said primary paths, and valve means disposed along the secondary flow passages and controllably movable between a first position opening said secondary passages to their respective primary paths to allow fluid flow both through said primary paths and secondary passages, and a second position substantially closing said secondary passages to fluid flow.

14. A turbocharger as set forth in claim 13 wherein said wall means closes a portion of the radially inner boundary of said primary paths generally at the upstream end of said scroll-shaped portion.

15. A turbocharger as set forth in claim 13 wherein said valve means comprises a sleeve mounted on said turbine housing along said secondary passages and having flow openings disposed in each of said passages to permit fluid flow through said sleeve and said secondary passages, and a valve insert movably carried within said sleeve for selectively controlling fluid flow through the flow openings.

16. A turbocharger as set forth in claim 13 wherein said valve means includes means disposed in both of said secondary passages for controllably and together opening and limiting said secondary passages to fluid flow.

17. A turbocharger comprising a compressor; and a fluid driven turbine drivingly coupled to said compressor, said turbine including a turbine housing having a fluid inlet portion and a generally scroll-shaped portion, a radially inwardly extending meridional septum dividing said inlet and scroll-shaped portions into a pair of axially displaced primary fluid flow paths, wall means formed integrally with said turbine housing for closing a portion of the radially inner boundary of said primary paths and having means extending radially inwardly therefrom for defining a pair of radially inwardly open secondary flow passages in communication with the primary paths, and valve means disposed along each of said secondary passages and controllably movable between a first position opening said secondary passages to fluid flow in respective ones of said primary paths to allow fluid flow both through said primary paths and secondary passages, and a second position uniformly and substantially closing said secondary passages to fluid flow.

18. A turbine housing for a turbomachine comprising a fluid inlet portion; a generally scroll-shaped portion joined to said inlet portion; a radially inwardly directed meridional septum extending along said inlet and scroll portions to define a pair of axially displaced primary fluid flow paths; wall means formed integrally with the housing for closing a portion of the radially inner boundary of said primary paths and for defining a radially inwardly open secondary flow path in communication with the primary paths; and valve means disposed along the secondary flow path and controllably movable between a first position opening said secondary path to said primary paths to allow fluid flow both through said primary and secondary paths, and a second position substantially closing said secondary path to fluid flow.

19. A turbine housing as set forth in claim 18 wherein said wall means includes a radially inwardly extending meridional septum dividing said secondary flow path into a pair of substantially similar secondary flow passages, said secondary flow passages being for communicating with respective ones of said primary paths.

20. A turbine housing as set forth in claim 19 wherein said valve means comprises a sleeve mounted on said turbine housing along said secondary passages and having flow openings disposed in each of said passages to permit fluid flow through said sleeve and said secondary passages, and a valve insert movably carried within said sleeve for selectively controlling fluid flow through the flow openings.

21. A turbine housing as set forth in claim 19 wherein said valve means includes means disposed in both of said secondary passages for controllably and together opening and limiting said secondary passages to fluid flow.

22. In a meridionally divided turbine housing having a pair of axially displaced primary flow paths formed along a fluid inlet portion and a generally scroll-shaped portion, apparatus for varying the housing fluid flow geometry comprising wall means fixed with respect to the turbine housing and forming a relatively short, radially inwardly open secondary fluid flow path open to said primary paths; and valve means disposed along said secondary path and controllably movable between a first position opening said secondary path to allow fluid flow both through said primary and secondary paths, and a second position substantially closing said secondary path to fluid flow.

23. Apparatus as set forth in claim 22 wherein said means forming said secondary path comprises wall means for closing a portion of the radially inner boundary of said primary paths and including a radially inwardly extending septum defining a path of radially inwardly open secondary flow passages open to respective ones of said primary paths.

24. Apparatus as set forth in claim 23 wherein said valve means includes means disposed in both of said secondary passages for controllably and together opening and limiting said secondary passages to fluid flow.

25. A method of controlling fluid flow through a turbine housing having a fluid inlet portion and a generally scroll-shaped portion, comprising the steps of dividing said inlet and scroll portions with a radially inwardly extending meridional septum to form a pair of axially displaced primary flow paths; closing the radially inner boundary of a portion of said primary paths with wall means fixed with respect to the turbine housing to form a radially inwardly open secondary flow path in communication with said primary paths; and controllably adjusting the valve means disposed along said secondary path between a first position opening said secondary path to allow fluid flow both through said primary and secondary paths, and a second position substantially closing said secondary path to fluid flow to allow unrestricted fluid flow through said primary paths.

26. The method of claim 25 including the step of meridionally dividing said secondary path into a pair of substantially similar secondary passages in communication with respective ones of said primary paths.

27. The method of claim 26 wherein said step of controllably adjusting said valve means comprises adjusting said valve means to controllably open and limit said secondary passages together.

28. The method of claim 25 wherein said closing step comprises closing a portion of the radially inner boundary of said primary paths generally at the upstream end of said scroll portion.

29. A method of controlling fluid flow through a turbine housing having a fluid inlet portion and a generally scroll-shaped portion, comprising the steps of dividing said inlet and scroll portions with a radially inwardly extending meridional septum to form a pair of axially displaced primary flow paths; closing the radially inner boundary of a portion of said primary paths with wall means formed integrally with the turbine housing to form a pair of radially inwardly open secondary flow passages in communication with respective ones of said primary paths; and controllably adjusting valve means disposed along said secondary passages between a first position opening said secondary passages to fluid flow to allow fluid flow both through said primary paths and secondary passages, and a second position substantially closing said secondary passages to fluid flow to allow unrestricted fluid flow only through said primary paths.

30. In a meridionally divided turbine housing having a pair of axially displaced primary fluid flow paths formed along a fluid inlet portion and a generally scroll-shaped portion, a method of varying the housing fluid flow geometry comprising the steps of closing the radially inner boundary of a portion of the primary paths with wall means formed integrally with the turbine housing to form a relatively short, radially inwardly open secondary fluid flow path communicating with said primary paths; and controllably adjusting valve means disposed along said secondary path between a first position opening said secondary path to allow fluid flow both through said primary and secondary paths, and a second position substantially closing said secondary path to fluid flow to allow unrestricted fluid flow only through the primary paths.

31. The method of claim 30 wherein said forming step comprises forming a pair of radially inwardly open secondary flow passages along said secondary path, said secondary passages being in communication with respective ones of said primary paths.

32. The method of claim 31 wherein said step of controllably adjusting said valve means comprises adjusting said valve means to controllably open and limit said secondary passages together.

33. A turbocharger comprising a compressor; and a fluid driven turbine drivingly coupled to said compressor, said turbine including a turbine housing having a fluid inlet portion and a generally scroll-shaped portion, a radially inwardly extending meridional septum dividing said inlet and scroll-shaped portions into a pair of axially displaced primary fluid flow paths, wall means for closing a portion of the radially inner boundary of said primary paths and defining a radially inwardly open secondary flow path in communication with said primary paths, and valve means including a sleeve mounted on the turbine housing along said secondary path and having flow openings to permit fluid flow through said sleeve and secondary path, and a valve insert movably carried within said sleeve and controllably movable between a first position opening said sleeve and secondary path to allow fluid flow through said primary and secondary paths, and a second position limiting fluid flow through said sleeve and secondary path.

34. A turbocharger comprising a compressor; and a fluid driven turbine drivingly coupled to said compressor, said turbine including a turbine housing having a fluid inlet portion and a generally scroll-shaped portion, a radially inwardly extending meridional septum dividing said inlet and scroll-shaped portions into a pair of axially displaced primary fluid flow paths, wall means for closing a portion of the radially inner boundary of said primary paths and having means extending radially inwardly therefrom defining a pair of radially inwardly open secondary flow passages open to respective ones of said primary paths, and valve means including a sleeve mounted on the turbine housing along said secondary passages and having flow openings disposed in each of said passages to permit fluid flow through said sleeve and said secondary passages, and a valve insert movably carried within said sleeve and controllably movable between a first position opening said sleeve flow openings and secondary passages to their respective primary paths to allow fluid flow through said primary paths and secondary passages, and a second position limiting fluid flow through said sleeve flow openings and secondary passages.

35. A turbocharger as set forth in claim 34 wherein said valve insert includes means for maintaining separate the flow through said secondary passages.

36. A turbocharger comprising a compressor; and a fluid driven turbine drivingly coupled to said compressor, said turbine including a turbine housing having a fluid inlet portion and a generally scroll-shaped portion, a radially inwardly extending meridional septum dividing said inlet and scroll-shaped portions into a pair of axially displaced primary fluid flow paths, wall means for closing a portion of the radially inner boundary of said primary paths and having means extending radially inwardly therefrom defining a pair of radially inwardly open secondary flow passages, and valve means including a sleeve mounted on the housing along each of said secondary passages and having flow openings disposed in each of said passages to permit fluid flow through said sleeve and said passages, and a valve insert movably carried within said sleeve and controllably movable between a first position opening said sleeve flow openings and secondary passages to fluid flow in respective ones of said primary paths to allow fluid flow through said primary paths and secondary passages, and a second position uniformly limiting fluid flow through said sleeve flow openings and secondary passages.

* * * * *